United States Patent [19]
Lazar

[11] Patent Number: 6,160,924
[45] Date of Patent: Dec. 12, 2000

[54] METHOD FOR FORMING A MAP OF A THREE-DIMENSIONAL OBJECT

[75] Inventor: Jonathan Noel Lazar, Huntington Beach, Calif.

[73] Assignee: Northrop Grumman Corporation, Los Angeles, Calif.

[21] Appl. No.: 09/133,784

[22] Filed: Aug. 12, 1998

[51] Int. Cl.[7] .................................... G06K 9/36
[52] U.S. Cl. .................... 382/285; 382/276; 382/277
[58] Field of Search .................... 382/285, 276, 382/277, 128, 131; 367/50, 52; 606/5; 701/120

[56]  References Cited

U.S. PATENT DOCUMENTS

| | | | |
|---|---|---|---|
| 4,674,046 | 6/1987 | Ozeki et al. | 364/414 |
| 4,736,436 | 4/1988 | Yasukawa et al. | 382/16 |
| 4,797,861 | 1/1989 | Beasley | 367/50 |
| 4,899,293 | 2/1990 | Dawson et al. | 364/521 |
| 5,038,285 | 8/1991 | Jouandet | 364/413.16 |
| 5,051,734 | 9/1991 | Lake, Jr. | 340/700 |
| 5,134,569 | 7/1992 | Masters | 364/474.24 |
| 5,170,439 | 12/1992 | Zeng et al. | 382/128 |
| 5,282,262 | 1/1994 | Kurashige | 395/126 |
| 5,389,101 | 2/1995 | Heilbrun et al. | 606/130 |
| 5,396,583 | 3/1995 | Chen et al. | 395/127 |
| 5,404,293 | 4/1995 | Weng et al. | 364/413.19 |
| 5,420,788 | 5/1995 | Vissers | 364/413.18 |
| 5,446,833 | 8/1995 | Miller et al. | 395/125 |
| 5,544,291 | 8/1996 | Gilley et al. | 395/123 |
| 5,561,756 | 10/1996 | Miller et al. | 395/155 |
| 5,592,563 | 1/1997 | Zahavi | 382/154 |
| 5,615,318 | 3/1997 | Matsuura | 395/120 |
| 5,647,018 | 7/1997 | Benjamin et al. | 382/128 |
| 5,807,381 | 9/1998 | Lieberman | 606/5 |
| 5,850,222 | 12/1998 | Cone | 345/418 |
| 5,933,517 | 8/1999 | Grangeat et al. | 382/131 |

OTHER PUBLICATIONS

Cao et al., "A Practical Reconstruction Algorithm for Multifocal Cone–Beam SPECT", Nuclear Science Symposium and Medical Imaging Conference, Conf. Record of the 1992 IEEE, vol. 2, pp. 1074–1076, 1992.

*Primary Examiner*—Jose L. Couso
*Assistant Examiner*—Anh Hong Do
*Attorney, Agent, or Firm*—Terry J. Anderson; Karl J. Hoch, Jr.

[57]  ABSTRACT

A method for forming a two-dimensional map of a three-dimensional object has the steps of mapping the three-dimensional object to an ellipsoid and then mapping the ellipsoid to a two-dimensional surface. Mapping of the three-dimensional object to the ellipsoid is accomplished by forming a plurality of generally parallel, generally planar slices of the three-dimensional objects which correspond to similar slices of the ellipsoid and projecting each point on the surface of a slice of the three-dimensional object to a corresponding point of the ellipsoid. Mapping the ellipsoid to two-dimensional surface may be done according to various different contemporary methodologies.

9 Claims, 2 Drawing Sheets

METHOD FOR FORMING A MAP OF A THREE-DIMENSIONAL OBJECT

FIELD OF THE INVENTION

The present invention relates generally to cartography and more particularly to a method for mapping a three-dimensional object to a two-dimensional surface.

BACKGROUND OF THE INVENTION

Methods for mapping spherical or ellipsoidal three-dimensional surfaces to two-dimensional surfaces so as to form maps thereof are well known. For example, various methods of mapping the earth's surface to a two-dimensional paper map are well known. In cartography, the most common methods of projection can be conceptually described by imagining a developable surface, which is a surface that can be made translated, i.e., made flat (two-dimensional) by cutting it along certain lines and unfolding or unrolling it. Such techniques include cylindrical projections, pseudo-cylindrical projections, conic projections, and azimuthal projections.

While no such projection is perfect, i.e., no projection can be simultaneously conformal and area-preserving, various projections do have advantages associated therewith. For example, some projections are conformal, while others are area-preserving. However, all such projections provide means by which every point on the surface of the object being mapped, e.g., the earth, is represented by a unique point on the two-dimensional or developable surface, e.g., a paper map. Further, such two-dimensional representations or maps attempt to be continuous, wherein every point thereof is generally adjacent the same points which are adjacent that point on the surface of the three-dimensional objects being mapped.

While contemporary methodology provide many means for projecting the surface of a three-dimensional sphere or ellipsoid to a two-dimensional map, no such methodology is suitable for projecting a generally arbitrary three-dimensional object onto a two-dimensional surface. More particularly, the Behrmann Cylindrical Equal-Area Projection, the Gall's Stereographic Cylindrical Projection, Peters Projection, Mercator Projection, Miller Cylindrical Projection, oblique Projection, Transverse Mercator Projection, Mollweide Projection, Eckert Projection, Robinson Projection, Sinusoidal Projection, Albers Equal Area Conic Projection, Equidistant Conic Projection, Lambert Conformal Conic Projection, Polyconic Projection, Azimuthal Equidistant Projection, Lambert Azimuthal Equal Area Projection, Orthographic Projection, and Stereographic Projection may be utilized to effect such mapping of the surface of an ellipsoid onto a two-dimensional surface, such as that of a paper map. However, none of these contemporary projections is suitable for mapping a generally arbitrary three-dimensional surface, such as that of a human heart, onto a two-dimensional surface, such as that of a paper map.

Those skilled in the art will appreciate that the mapping of a three-dimensional surface, such as a human heart, onto a two-dimensional surface, such as a paper map, will provide benefits in various different applications. For example, in medical applications, wherein it is desirable to precisely locate and map various different anatomical structures, such as organs, such mapping provides a convenient means for identifying and locating various different features of such anatomical structures, such as ducts, blood vessels, nerves, tissue types, tumors, lesions, etc.

In view of the foregoing, it would be desirable to provide methodology for projecting a generally arbitrary three-dimensional surface to a two-dimensional surface.

SUMMARY OF THE INVENTION

The present invention addresses and alleviates the above mentioned deficiencies associated with the prior art. More particularly, the present invention comprises a method for forming a map of a three-dimensional object. The method comprises the steps of first mapping the three-dimensional object to an ellipsoid, such as a sphere, and then mapping the ellipsoid to a two-dimensional surface, such as a paper map.

The step of mapping the three-dimensional object to an ellipsoid preferably comprises forming a plurality of generally parallel, generally planar slices of the three-dimensional object. Each slice of the three-dimensional object will have a finite thickness associated therewith. As those skilled in the art will appreciate, the desired resolution of the final, two-dimensional map will depend substantially upon the thickness of the slices so formed. Thus, by forming a larger number of slices of the three-dimensional object, greater resolution of the final map upon the two-dimensional surface is achieved.

The step of mapping the three-dimensional object to an ellipsoid preferably comprises the steps of defining an axis of the three-dimensional object; defining a plurality of slices of the three-dimensional object, wherein each slice is preferably generally perpendicular to the axis; defining a corresponding number of slices of the ellipsoid, and projecting each slice of the three-dimensional object to an associated slice of the ellipsoid. Preferably, the axis of the three-dimensional object is formed such that it passes through a geometric center of the object. However, those skilled in the art will appreciate that it is not necessary that the axis passed through the center of the three-dimensional object, rather, the axis may be formed in any convenient manner. However, those skilled in the art will further appreciate that many times the most convenient axis of a three-dimensional object is that axis which, does indeed, pass through a geometric center of the three-dimensional object.

The step of projecting each slice of the three-dimensional object to an associated slice of the ellipsoid preferably comprises projecting each slice of the three-dimensional object to a slice of the ellipsoid wherein the slice of the ellipsoid to which the slice of the three-dimensional object is mapped is determined by a common indexing scheme. That is, the three-dimensional object is indexed by starting at one end of the axis and assigning an index number to each slice along the axis such that each slice of the axis has a unique index number. The sphere is similarly indexed, from one end to the other end thereof, such that a common indexing scheme is defined wherein every slice of the three-dimensional object corresponds to a similarly positioned slice of the ellipsoid. For example, the bottom center, and top slices of the three-dimensional object corresponds to the bottom center, and top slices of the ellipsoid respectively.

According to the preferred embodiment of the present invention, the step of mapping the ellipsoid to a two-dimensional surface comprises projecting the ellipsoid onto a two-dimensional surface. Those skilled in the art will appreciate that various different methodologies for projecting an ellipsoid onto a two-dimensional surface are suitable. For example, a Behrmann Cylindrical Equal-Area Projection, Gall's Stereographic Cylindrical Projection, Peters Projection, Mercator Projection, Miller Cylindrical Projection, Oblique Projection, Transverse Mercator Projection, Mollweide Projection, Eckert Projection, Robinson Projection, Sinusoidal Projection, Albers Equal Area Conic Projection, Equidistant Conic Projection, Lambert Conformal Conic Projection, Polyconic Projection, Azimuthal Equidistant Projection, Lambert Azimuthal Equal Area Projection, Orthographic Projection, or Stereographic Projection may be utilized.

Thus, according to the present invention, a method for forming a two-dimensional map of the three-dimensional object is provided. Thus, the present invention provides means for representing three-dimensional objects, such as anatomical structures, on two-dimensional surfaces, such as upon paper, on a CRT or other computer display, etc.

DETAILED DESCRIPTION OF THE PREFERRED EMBODIMENT

The detailed description set forth below in connection with the appended drawings is intended as a description of the presently preferred embodiment of the invention, and is not intended to represent the only form in which the present invention may be constructed or utilized. The description sets forth the functions and the sequence of steps for constructing and operating the invention in connection with the illustrated embodiment. It is to be understood, however, that the same or equivalent functions may be accomplished by different embodiments that are also intended to be encompassed within the spirit and scope of the invention.

Figure 1:
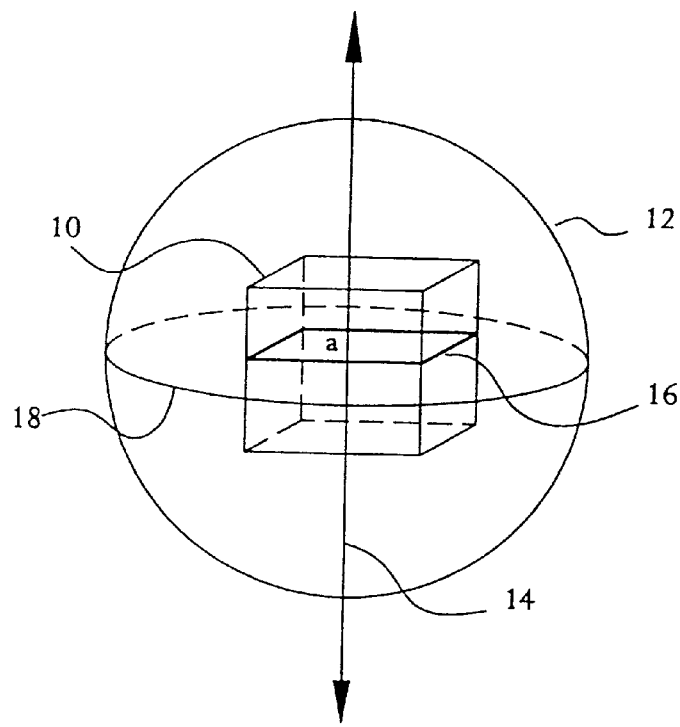
FIG. 1 shows the process of projecting a three-dimensional object onto a sphere.
Figure 2:
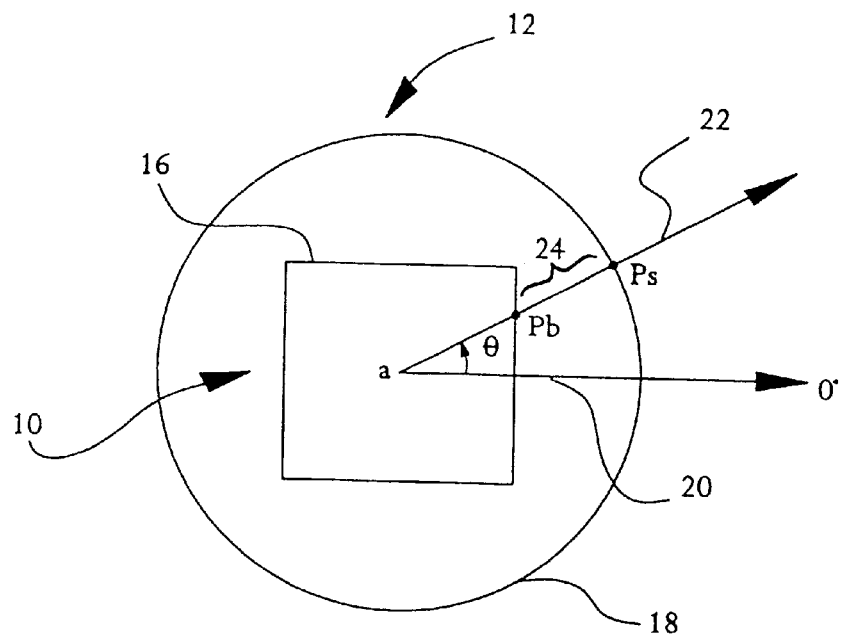
FIG. 2 shows the step of projecting a selected slice of the three-dimensional object of FIG. 1 onto a corresponding slice of the sphere.
Figure 3:
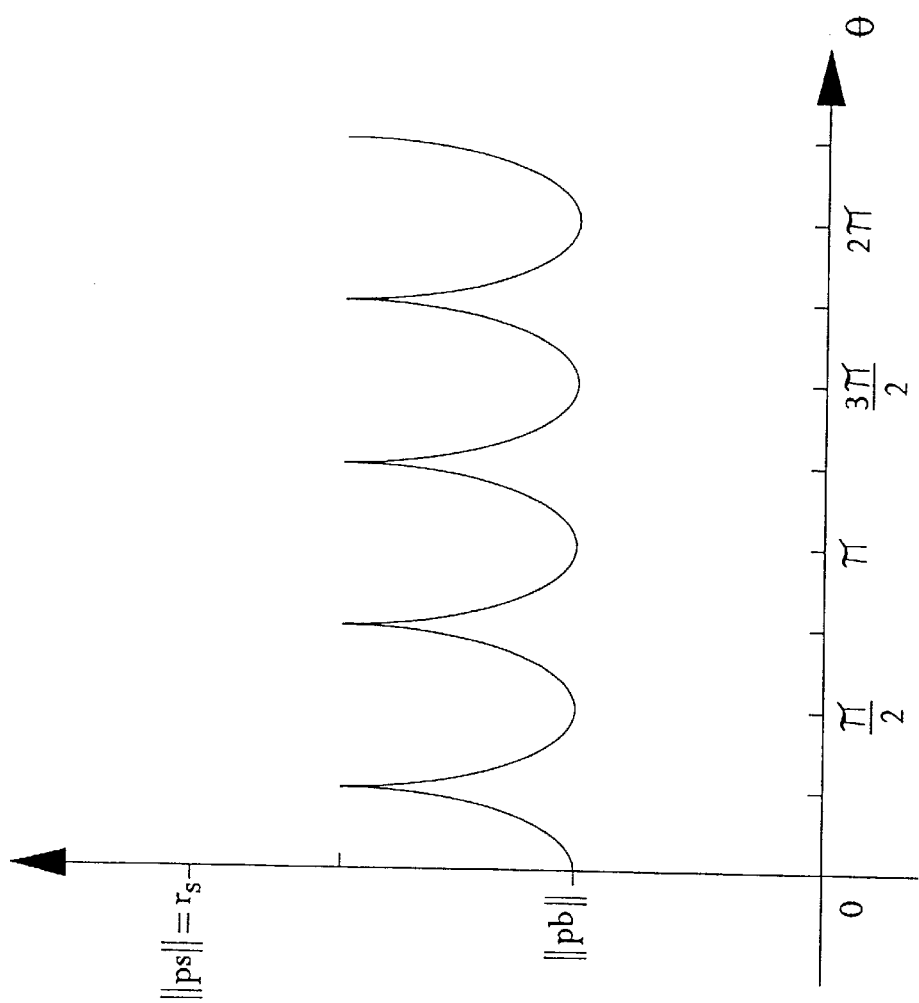
FIG. 3 shows the result of the projection of FIG. 2 graphically.

The method for forming a two-dimensional map from a three-dimensional object according to the present invention is illustrated in FIGS. 1–3 of the drawings, which show a presently preferred embodiment thereof.

Referring now to FIG. 1, the present invention comprises first mapping or projecting the surface of the three-dimensional object, such as cube 10, onto the surface of an ellipsoid, such as sphere 12. Preferably, this process comprises the steps of forming an axis 14 through the three-dimensional object 10. Then, a plurality of slices, such as slice 16 of the three-dimensional object or cube 10 are defined along the axis 14. Each slice, such as 16, is then projected to a corresponding slice 18 of the sphere 12, so as to map the three-dimensional object 10 onto the sphere 12.

It is important to note that each slice 16 of the cube 10 and each slice 18 of the sphere 12 has a finite thickness. The resolution with which the projection is performed is determined by the thickness of the slices 16, 18. As those skilled in the art will appreciate, the thinner the slices 16, 18, the greater the resolution of such projection, since a larger number of such slices 16, 18 are utilized.

In this manner, the surface of the three-dimensional object or cube 10 is projected to the surface of the sphere 12.

As those skilled in the art will appreciate, various methodologies are suitable for projecting the surface of the sphere 12 onto a two-dimensional surface, such as a paper map or computer display. For example, the Behrmann Cylindrical Equal-Area Projection, Gall's Stereographic Cylindrical Projection, Peters Projection, Mercator Projection, Miller Cylindrical Projection, oblique Projection, Transverse Mercator Projection, Mollweide Projection, Eckert Projection, Robinson Projection, Sinusoidal Projection, Albers Equal Area Conic Projection, Equidistant Conic Projection, Lambert Conformal Conic Projection, Polyconic Projection, Azimuthal Equidistant Projection, Lambert Azimuthal Equal Area Projection, Orthographic Projection, or Stereographic Projection may be utilized.

Referring now to FIG. 2, the process for projecting the selected slice 16 of the three-dimensional object 10 onto the corresponding slice 18 of the sphere 12 is shown in further detail. This projection is accomplished by first forming an arbitrary ray, such as 0° ray 20. Then, another ray, referred to as the distance ray, is swept in one direction, counterclockwise, for example, so as to form a plurality of new rays 22 with respect to the zero degree ray. Each such new ray 22 forms an angle 8 with respect to 0° ray 20. Each new ray 22 further defines a distance 24 between point PB of the slice 16 of the cube 10 and point PS of the slice 18 of the circle 12.

Referring now to FIG. 3, each such distance 24 from PB to PS may be represented graphically as shown. This data may be represented upon a two-dimensional map by utilizing a density or color scale, wherein the density or color is representative of the distance A PS, or similarly of the distance PS PB, that is, each horizontal line on the ellipse, for example, and each corresponding curve of virtual latitude of the two-dimensional map, may vary in density thereacross according to the function shown in FIG. 3, or similarly its complement, so as to provide a two-dimensional representation of the cube 10.

Similarly, native properties of the object, such as its color, texture, temperature, and so forth, may be represented by a color scale, such that each point of the ellipsoid is colored to represent this property of the point of the object that is mapped to it.

It is understood that the exemplary method for forming a map of a three-dimensional object described herein and shown in the drawings represents only a presently preferred embodiment of the invention. Indeed, various modifications and additions may be made to such embodiment without departing from the spirit and scope of the invention. For example, those skilled in the art will appreciate that various different algorithms for performing the projections of the present invention are suitable therefore. Further, various means of representing the three-dimensional surface upon a two-dimensional surface are contemplated. Thus, these and other modifications and additions may be obvious to those skilled in the art and may be implemented to adapt the present invention for use in a variety of different applications.

What is claimed is:

1. A method for forming a map of a three-dimensional object, the method comprising the steps of;
    (a) defining an axis of the three-dimensional object;
    (b) defining a plurality of slices of the three-dimensional object, each of the slices being generally perpendicular to the axis;
    (c) defining a corresponding number of slices of the ellipsoid;
    (d) projecting each slice of the three-dimensional object to an associated slice of an ellipsoid;
    (e) mapping the slices of the ellipsoid to a developable surface; and
    (f) translating the developable surface to a two-dimensional surface.

2. The method as recited in claim 1, wherein the ellipsoid being a sphere.

3. The method as recited in claim 1, wherein the three-dimensional object having an interior and wherein the step (a) the axis being defined to pass through the interior.

4. The method as recited in claim 3, wherein the three-dimensional object having a geometric center and wherein the step (a) the axis being defined to pass generally through the geometric center.

5. The method as recited in claim 1, wherein step (b) comprises projecting a plurality of rays from the axis of the three-dimensional object, adjacent rays defining a respective slice of the three-dimensional object.

6. The method as recited in claim 1, wherein step (d) each slice of the ellipsoid to which each slice of the three-dimensional object is projected being determined by a common indexing scheme.

7. The method as recited in claim 1, wherein step (e) the mapping of the ellipsoid to a two-dimensional surface comprises projecting the ellipsoid onto a two-dimensional surface.

8. The method as recited in claim 1, wherein step (e) the mapping of the ellipsoid to a two-dimensional surface comprises mapping the ellipsoid to the two-dimensional surface via a method selected from the list consisting of:

(a) Behrmann Cylindrical Equal-Area Projection;
(b) Gall's Stereographic Cylindrical Projection;
(c) Peters Projection;
(d) Mercator Projection;
(e) Miller Cylindrical Projection;
(f) Oblique Projection;
(g) Transverse Mercator Projection;
(h) Mollweide Projection;
(i) Eckert Projection;
(j) Robinson Projection;
(k) Sinusoidal Projection;
(l) Albers Equal Area Conic Projection;
(m) Equidistant Conic Projection;
(n) Lambert Conformal Conic Projection;
(o) Polyconic Projection;
(p) Azimuthal Equidistant Projection;
(q) Lambert Azimuthal Equal Area Projection;
(r) Orthographic Projection; and
(s) Stereographic Projection.

9. A method for forming a map of a three-dimensional object, the method comprising the steps of;

(a) defining an axis of the three-dimensional object;
(b) projecting a plurality of rays from the axis of the three-dimensional object, adjacent rays defining a respective slice of the three-dimensional object, each of the slices being generally perpendicular to the axis;
(c) defining a corresponding number of slices of the ellipsoid;
(d) projecting each slice of the three-dimensional object to an associated slice of an ellipsoid; and
(e) mapping the slices of the ellipsoid to a developable surface; and
(f) translating the developable surface to a two-dimensional surface.

* * * * *